(12) United States Patent
Blankenship et al.

(10) Patent No.: US 7,709,106 B2
(45) Date of Patent: May 4, 2010

(54) REFLECTIVE CRACK RELIEF PAVEMENT INTERLAYER WITH IMPROVED LOAD BEARING CAPACITY AND METHOD FOR DESIGNING INTERLAYER

(75) Inventors: Phillip B. Blankenship, Wichita, KS (US); Richard Kent Steger, Wichita, KS (US); Richard W. May, Wichita, KS (US)

(73) Assignee: Road Science, L.L.C., Tulsa, OK (US)

( * ) Notice: Subject to any disclaimer, the term of this patent is extended or adjusted under 35 U.S.C. 154(b) by 350 days.

(21) Appl. No.: 10/631,149

(22) Filed: Jul. 31, 2003

(65) Prior Publication Data

US 2005/0022696 A1    Feb. 3, 2005

(51) Int. Cl.
*B32B 9/00* (2006.01)
(52) U.S. Cl. ......................................... 428/701; 428/95
(58) Field of Classification Search ................ 428/408, 428/701, 698, 95, 17; 404/17, 6; 524/60; 106/405; 61/38
See application file for complete search history.

(56) References Cited

U.S. PATENT DOCUMENTS

| | | | |
|---|---|---|---|
| 3,822,556 A * | 7/1974 | Cramwinckel et al. ...... 405/270 |
| 3,891,585 A | 6/1975 | McDonald |
| 3,907,582 A | 9/1975 | Walter |
| 5,290,833 A * | 3/1994 | Schmanski ................... 524/71 |
| 5,306,750 A | 4/1994 | Goodrich |
| 5,445,473 A | 8/1995 | Chaverot et al. |
| 5,513,925 A | 5/1996 | Dempsey et al. |
| 6,089,783 A | 7/2000 | Goacolou |
| 6,248,396 B1 | 6/2001 | Helf |
| 6,669,773 B2 * | 12/2003 | Malloy et al. ............... 106/705 |

FOREIGN PATENT DOCUMENTS

GB        1448158      *  9/1976

OTHER PUBLICATIONS

Construction and Building Materials 16 (2002) 313-319 Jian-Shiuh Chen Evaluation of internal resistance in hot mix asphalt concrete (available on-line Aug. 13, 2002).*
Sand Anti-Fracture (SAF) Mixture Trial Handout, 1998.
Sand Anti-Fracture Layer "SAF" Handout, 1997.

* cited by examiner

*Primary Examiner*—David R Sample
*Assistant Examiner*—Daniel Miller
(74) *Attorney, Agent, or Firm*—Head, Johnson & Kachigian, P.C.

(57) ABSTRACT

A highly strain tolerant, substantially moisture impermeable, reflective crack relief interlayer is provided. The interlayer includes a polymer modified asphalt binder mixed with a dense fine aggregate mixture containing a substantial amount of manufactured sand. The interlayer mix is designed using a fatigue test and a stability test. Preferably, a hot mix asphalt overlay that is compatible with the interlayer, as well as the demands of local traffic and climate, is placed over the interlayer so that a protected, smooth paved surface is provided. The interlayer may delay the first appearance of cracks and the severity of cracks for several years compared with traditional hot mix overlays and extend pavement service life.

9 Claims, 3 Drawing Sheets

*AASHTO T-246, at 60° C*

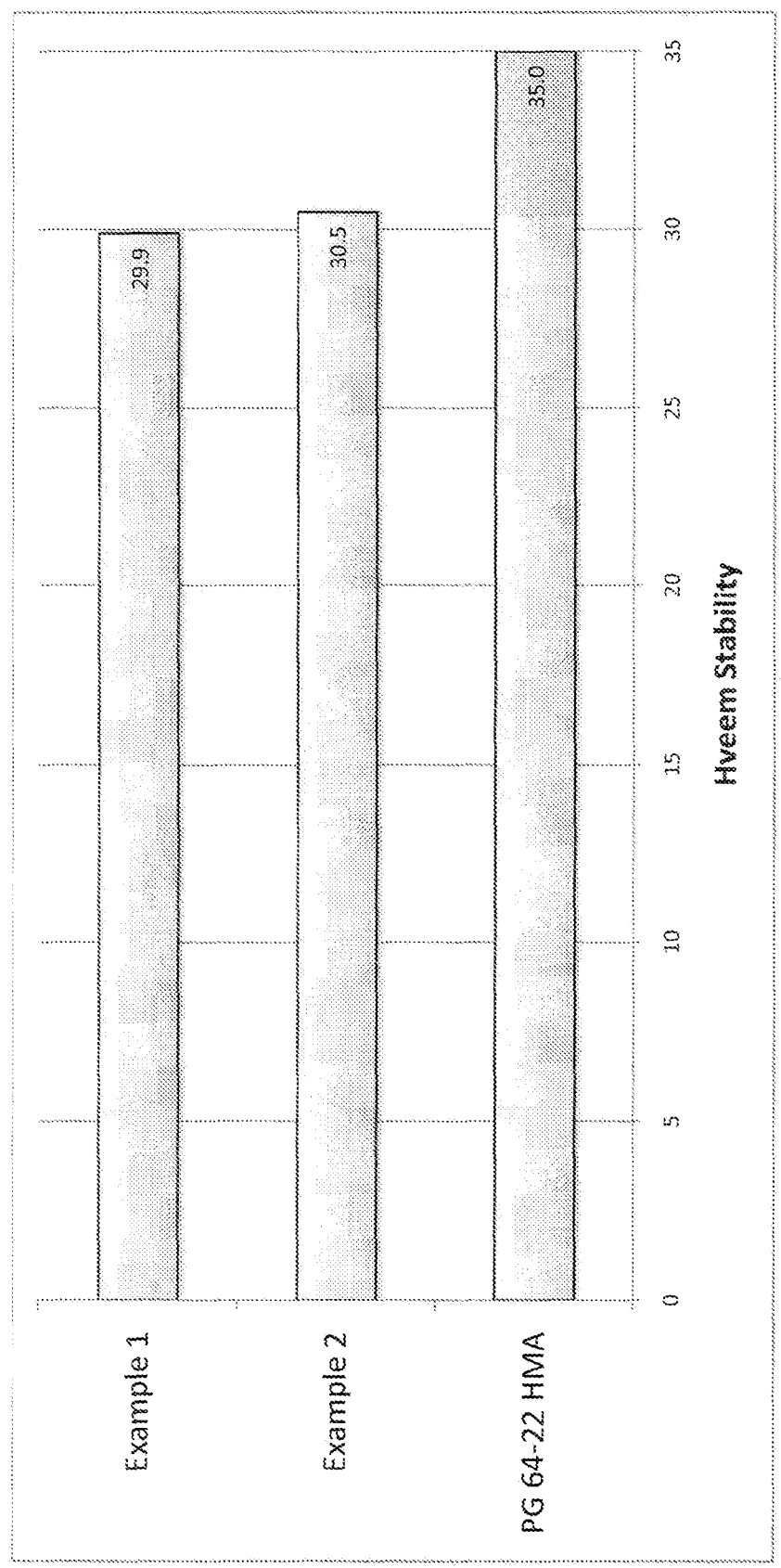

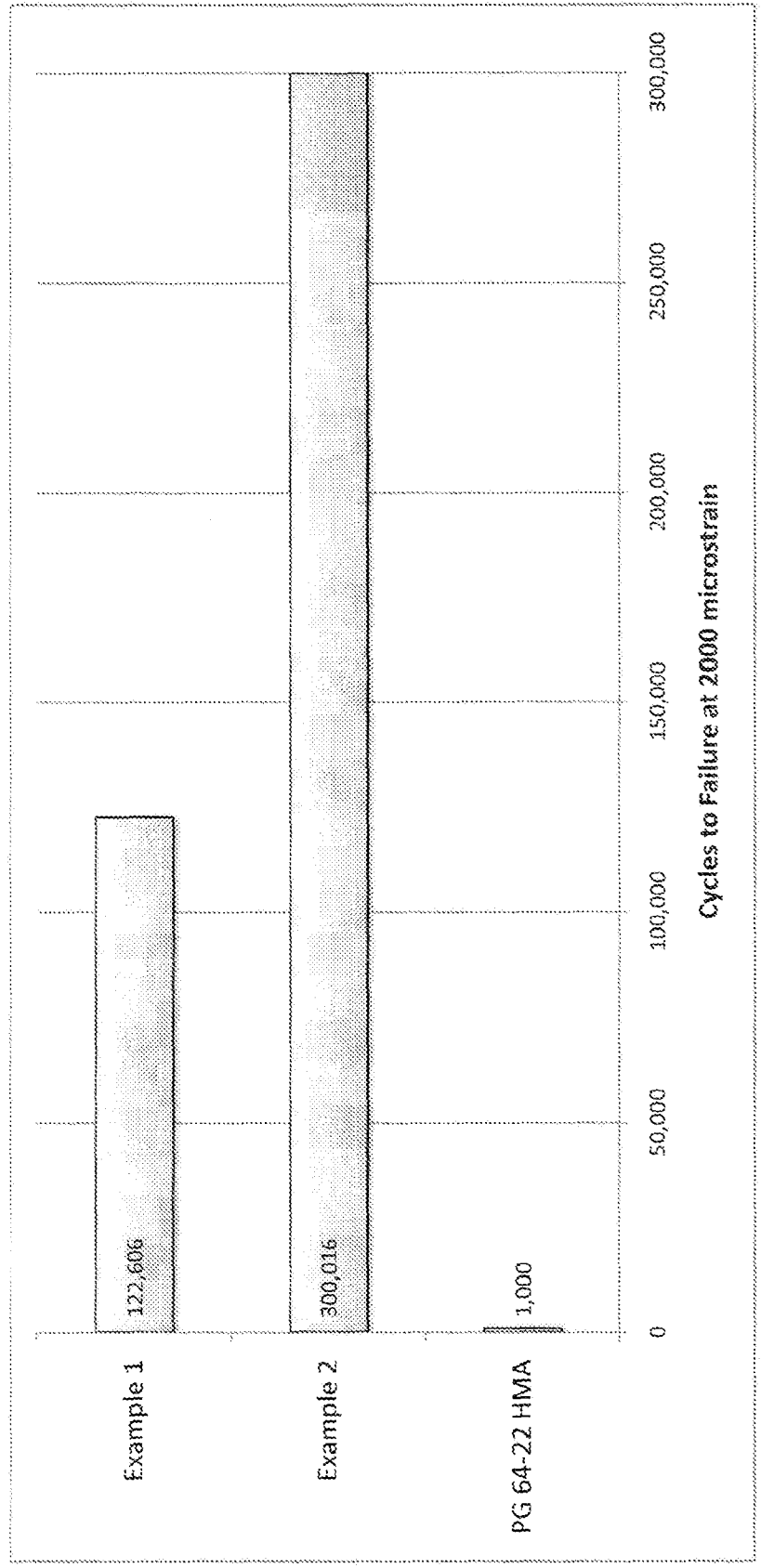

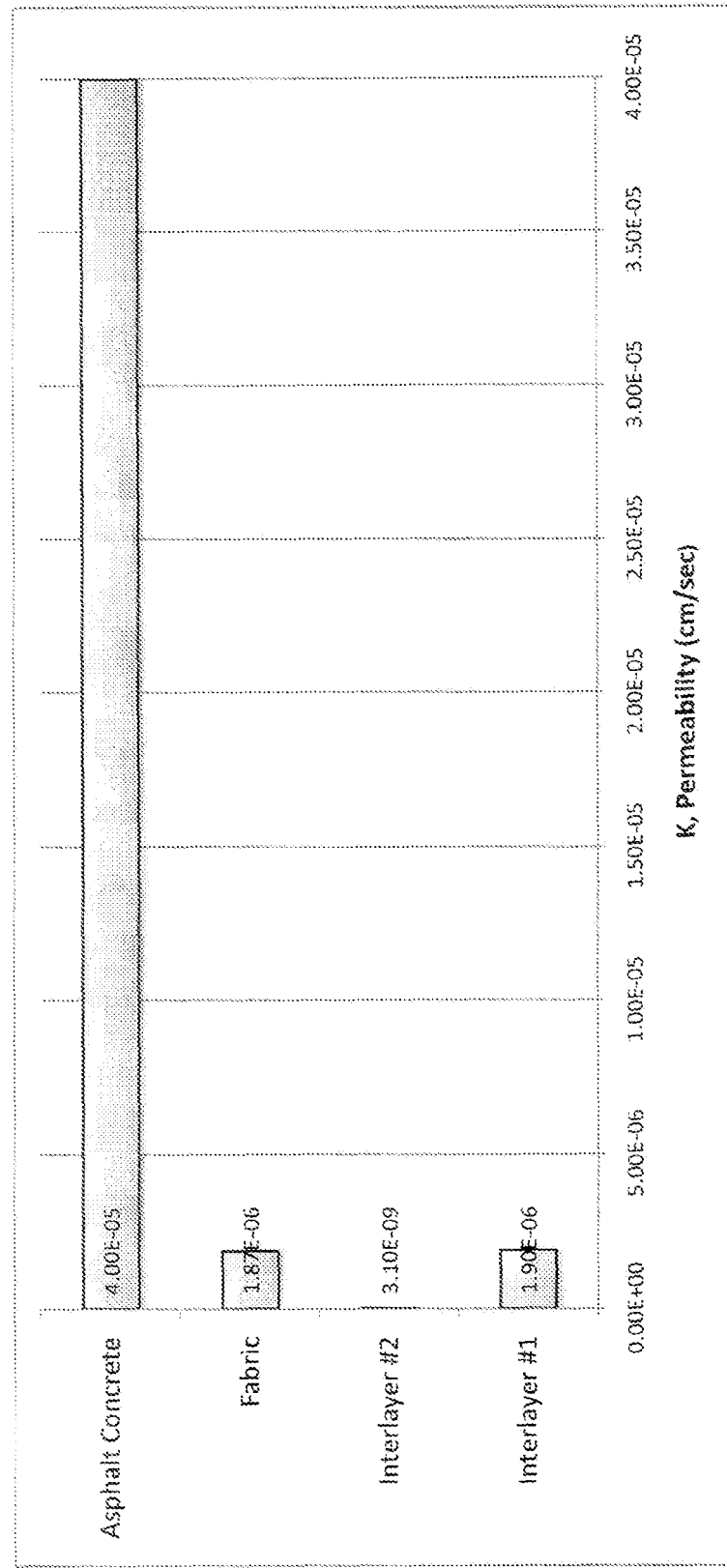

REFLECTIVE CRACK RELIEF PAVEMENT INTERLAYER WITH IMPROVED LOAD BEARING CAPACITY AND METHOD FOR DESIGNING INTERLAYER

STATEMENT REGARDING FEDERALLY SPONSORED RESEARCH OR DEVELOPMENT

Not Applicable.

CROSS-REFERENCE TO RELATED APPLICATIONS

Not Applicable.

BACKGROUND OF THE INVENTION

The present invention relates to an interlayer placed on cracked pavement. More specifically, this interlayer includes a mixture of aggregate and preferably polymer modified asphalt that is used to delay or minimize the occurrence of cracking, control crack severity, reduce overlay thickness, and enhance waterproofing capabilities.

When pavements deteriorate, they may be overlaid with hot mix asphalt (HMA) to repair them. When designing an overlay, the rate of crack propagation through the overlay, the rate of deterioration of the reflective crack, and the amount of water that can infiltrate through the cracks must be considered. One disadvantage with such HMA overlays is that cracks in the old pavement reflect through the new overlay. To relieve this reflective cracking, thicker overlays are often placed. Another disadvantage with such HMA overlays is that they are permeable allowing water to enter the base. A third disadvantage with these overlays is that they typically have a low strain tolerance and a low resistance to reflective cracking.

Other reflective crack control measures that are used to rehabilitate distressed pavements include placing stress-absorbing membrane interlayers (SAMI), placing grids or fabrics as an interlayer before placing HMA, breaking and seating of pavement, rubblization of pavement, and reconstruction. One disadvantage with some of these processes is that they can be expensive. Another disadvantage with these processes is that if the paved surface is not reconstructed, it may still have cracking problems soon after construction.

As discussed above, one disadvantage with typical HMA overlays is that they have a low resistance to reflective cracking. A typical highway HMA surface mixture has a fatigue life of only about 2000-10,000 cycles, when tested at 10° C. with a strain amplitude of 2000 microstrains and frequency of 10 Hz using a 4-point bending beam apparatus. Accordingly, fatigue resistant interlayers have been introduced to retard reflective cracking. These interlayers may have a fatigue life greater than 200,000 cycles, at identical testing conditions. However, in order to get such a fatigue life and retard the progression of reflective cracks in the pavement, these interlayers sacrifice a degree of its load bearing capacity, as measured in the Hveem stabilometer, and typically have Hveem stabilities of about 18-21.

As a consequence of their high compliance, one disadvantage with these interlayers is that they tend to have inferior load bearing capacity and have a propensity toward showing a lack of dimensional stability under load. In order to compensate for their inferior stability, these interlayers are placed below the top layers of a pavement structure so that they are not exposed to direct traffic loads. Thicker top layers help to improve the total structural stability but are costly. Still further, the top layers of the pavement structure cannot completely compensate for the inferior load bearing capacity of the interlayer.

In order to overcome these disadvantages, an improved interlayer that is able to slow reflective cracking, resist rutting and protect the pavement structure is needed. Still further, this interlayer should be easy to apply and provide a smooth riding surface.

SUMMARY OF THE INVENTION

It is an object of the present invention to provide a substantially moisture impermeable interlayer for distressed pavement so that the distressed pavement is protected from moisture.

Another object of the present invention is to provide a method for slowing the deterioration of pavements that are reaching the end of their design life so as to delay the reconstruction of these pavements.

The present invention includes a highly strain tolerant, substantially moisture impermeable, hot mix reflective crack relief interlayer. The interlayer includes a polymer modified asphalt binder mixed with a dense fine aggregate mixture that is made primarily from manufactured sand. The interlayer mix is designed using a fatigue test and a stability test. Preferably, an HMA overlay that is compatible with the interlayer, as well as the demands of local traffic, is placed over the interlayer so that a protected, smooth paved surface is provided. The interlayer of the present invention may delay the first appearance of cracks and reduce the severity of cracks for several years compared with traditional hot mix overlays.

Additional objects, advantages, and novel features of the invention will be set forth in the description that follows and in part will become apparent to those skilled in the art upon examination of the following, or may be learned by practice of the invention.°

BRIEF DESCRIPTION OF THE DRAWINGS

In the accompanying figures, which form a part of the specification and are to be read in conjunction therewith:

FIG. 1 is a bar graph showing Hveem stability results;
FIG. 2 is a bar graph showing fatigue performance; and
FIG. 3 is a bar graph showing permeability.

DETAILED DESCRIPTION OF THE PREFERRED EMBODIMENT

The interlayer of the present invention is placed on distressed paved surfaces. The interlayer delays cracks from reflecting through it. Raveling and further deterioration of those cracks that do appear is also delayed. It is made of hot mix asphalt, and it is mixed, transported, placed, and compacted using standard equipment. The present invention includes designing the mix for the interlayer by testing the interlayer mixture for performance. The design of the interlayer mixture is approached interactively in the process of the present invention by selecting aggregate and asphalt binder through iterations until an interlayer with desired properties is created.

The interlayer of the present invention is highly strain tolerant and substantially moisture impermeable. Preferably, it is covered with a specified lift of hot mix asphalt (HMA) designed to complement it and provide additional desired crack resistance. Most preferably, this HMA overlay is compatible with the interlayer, as well as the demands of local traffic. Still further, the interlayer of the present invention is able to protect the underlying pavement from moisture coming through cracks that may form in the HMA overlay.

The interlayer is a mixture of a polymer modified asphalt binder and aggregate. The interlayer is made by selecting the binder as follows. The polymer modified asphalt binder is selected based on the climate where the interlayer will be placed. Using LTPPBind™ software (Version 2.1) at 98% reliability and a depth of 0 mm, an appropriate binder is selected for the desired climate. The climate can be classified into one of 3 categories: Northern (Type I), Central (Type II), and Southern (Type III). The LTPPBind™ software is also used to select the appropriate test temperature for testing the fatigue life of the mixture, which is discussed below.

Preferably, the binder is graded according to the AASHTO MP-1 specification, more commonly referred to as the Performance Graded (PG) method. The Brookfield viscosity of the binder at 135° C. should be less than about 4500 cPs for workability. Preferably, the binder's viscosity is less than about 3500 cPs, and most preferably, it is less than about 3000 cPs.

A minimum shear modulus for the interlayer to resist rutting must be specified. This is done by specifying a minimum high temperature PG grade. This minimum high temperature PG grade depends on the climate or region of the country in which the interlayer will be placed. Selection guidelines for high temperature PG grades are given in Table 1.

There must also be a minimum low temperature PG grade to protect against the potential of single event thermal cracking from shrinking of the interlayer mixture at low temperature. The minimum requirements are also described in Table 1.

Finally, the ability of the interlayer binder to relax stress is quantified by a ductility test on a Rolling Thin Film Oven (RTFO)-aged binder at a temperature of 4° C. with a strain rate of 5 cm/min. Preferably, a force transducer is used during the ductility test to measure force. The binder must maintain at least about one pound force without breaking while meeting the minimum requirements as set forth in Table 1. If the binder breaks before meeting these elongation requirements or cannot meet these elongation requirements, then a different binder should be selected.

Preferably, the best interlayer binder for the climate is selected from Table 1:

An appropriate asphalt base that will meet the low temperature PG requirements is needed. Preferably, it is modified with polymer as necessary to achieve the minimum high temperature PG and ductility requirements as set forth in Table 1. Preferably, the polymer and asphalt are stable against separation in heated storage. The resulting binder should have the minimum properties as set forth in Table 1 for the particular binder type (I, II, or III) selected.

The binder used in making the interlayer of the present invention should possess both high ductility at low temperatures and high shear strength at high temperatures while maintaining a viscosity low enough to allow for effective mixing and compaction. By choosing a binder with these properties, an interlayer can be designed that is able to withstand, simultaneously, high strains from vertical and horizontal deflection of underlying pavement layers and high shear stresses from traffic.

In designing the interlayer of the present invention, information is obtained regarding the existing paved surface and its traffic levels. Following this, the aggregate is selected as shown in Table 2:

TABLE 2

| | Gradations | | |
|---|---|---|---|
| Sieve | Most Preferably % Passing | Preferably % | % Passing |
| ½ inch (12.5 mm) | 100 | 100 | 100 |
| ⅜ inch (9.5 mm) | 100 | 100 | 95-100 |
| No. 4 (4.75 mm) | 91-100 | 85-100 | 80-100 |
| No. 8 (2.36 mm) | 70-80 | 65-82 | 60-85 |
| No. 16 (1.18 mm) | 45-58 | 45-65 | 40-70 |
| No. 30 (600 µm) | 30-44 | 30-50 | 25-55 |
| No. 50 (300 µm) | 20-26 | 17-32 | 15-35 |

TABLE 1

| LTPP Binder Grade | Binder Type | A | B | C | D |
|---|---|---|---|---|---|
| Colder than PG XX-28 | I | 52° C. | 58° C. | 64° C. | −28° C. |
| PG XX-28 to XX-22 | II | 58° C. | 64° C. | 70° C. | −22° C. |
| Warmer than PG XX-22 | III | 64° C. | 70° C. | 76° C. | −16° C. |

| LTPP Binder Grade | Binder Type | E | F | G | H | I |
|---|---|---|---|---|---|---|
| Colder than PG XX-28 | I | −34° C. | −40° C. | 30 cm | 50 cm | 80 cm |
| PG XX-28 to XX-22 | II | −28° C. | −34° C. | 20 cm | 30 cm | 50 cm |
| Warmer than PG XX-22 | III | −22° C. | −28° C. | 10 cm | 20 cm | 35 cm |

Notes:
A Minimum temperature at which the binder complex shear modulus divided by the sine of the phase angle (G*/sin δ) is 2.2 KPa or greater on RTFO residue (AASHTO MP-1);
B Minimum temperature at which the binder G*/sin δ is 2.2 KPa or greater on RTFO residue, more preferably;
C Minimum temperature at which the binder G*/sin δ is 2.2 KPa or greater on RTFO residue, most preferably;
D Maximum temperature at which the binder creep stiffness (S) at 60 seconds is 300 MPa or less on Pressure Aging Vessel (PAV) residue (AASHTO MP-1 using Bending Beam Rheometer (BBR) with test run 10° C. warmer than actual PG grade);
E Maximum temperature at which the binder (S) at 60 seconds is 300 MPa or less on PAV residue, more preferably;
F Maximum temperature at which the binder (S) at 60 seconds is 300 MPa or less on PAV residue, most preferably;
G Minimum 4° C. ductility on RTFO residue; 5 cm/min strain rate, straight-sided molds (ASTM D113-99);
H Minimum 4° C. ductility on RTFO residue; 5 cm/min strain rate, straight-sided molds, more preferably; and
I Minimum 4° C. ductility on RTFO residue; 5 cm/min strain rate, straight-sided molds, most preferably.
All measurements in Table 1 are approximate measurements.

TABLE 2-continued

Gradations

| Sieve | Most Preferably % Passing | Preferably % | % Passing |
|---|---|---|---|
| No. 100 (150 μm) | 10-15 | 9-18 | 8-20 |
| No. 200 (75 μm) | 8-10 | 7-12 | 6-14 |

The percentages shown in Table 2 are approximate values.

The aggregate is blended to meet the above gradations. A procedure to measure gradation, such as Sieve Analysis of Fine and Course Aggregates (AASHTO T 27), may be used following the above-listed sieve breakdowns.

In order to increase the load bearing capacity of the interlayer being created without sacrificing fatigue performance and the ability to retard reflective cracking, the aggregate mixture should be no more than 15% by weight natural sand. Instead, the aggregate mixture should be made primarily of manufactured sand. Manufactured sand includes processed materials. Any material processed by cutting, crushing or reducing it in size in any manner is considered manufactured sand. Unprocessed materials are classified as natural sand. The manufactured sand, as a result of its manufacturing process, contains surfaces that are more angular than natural sand, which tends to be more rounded. Typically, the manufactured sand has an angularity, which is tested by naturally compacting the sand using the weight of gravity, of at least about 38% of uncompacted voids. Preferably, the angularity is tested according to ASHTO T-304. Preferably, the manufactured sand has an angularity of at least about 40%. Most preferably, the manufactured sand has an angularity of at least about 42%.

In making the interlayer of the present invention, the aggregate mixture should have about 0-15% by weight natural sand. Preferably, the aggregate mixture has about 0-10% by weight natural sand. Most preferably, the aggregate mixture has about 0-5% by weight natural sand.

The angularity of manufactured sand provides for a greater degree of interlocking between adjacent aggregate particles and provides an unexpectedly dramatic increase in the dimensional stability of the interlayer mix, according to stability tests and more specifically, according to tests with the Hveem stabilometer.

It is also desirable to perform a test to measure the relative proportions of fine dust or clay-like material included with the aggregates. Preferably the Standard Method of Test for Plastic Fines in Graded Aggregates and Soils by Use of the Sand Equivalent Test (AASHTO T 176) is followed. Preferably, the blend of all aggregates shall meet a minimum of 45%.

If the aggregate does not pass the above-outlined tests, then it must be re-selected. If the aggregate passes the tests, then trial blends of aggregate and binder are made. The mixture is conditioned for short-term and long-term conditioning to simulate the pre-compaction phase of the construction process and the aging that occurs over the service life of the pavement.

The theoretical maximum specific gravity ($G_{mm}$) of the uncompacted mixture is determined. Preferably, the standard method of Test for Theoretical Maximum Specific Gravity and Density of Bituminous Paving Mixtures(AASHTO T 209) is used on 500 g samples at 25° C. The percentage of air voids is determined using $G_{mm}$.

A mix design based on the volumetric properties of the HMA in terms of air voids is created. The loose mixture should be aged for about 2 hours at a compaction temperature according to AASHTO PP2-99 Section 7.1 Volumetric Testing. Preferably, 2 specimens are compacted at 50 gyrations using a 100-mm Superpave gyratory compactor (SGC) mold. Preferably, the Standard Practice for Superpave Volumetric Design for Hot-Mix Asphalt (HMA) (AASHTO PP28-99 Section 8) is performed. The mold and mix should be at about the compacting temperature.

Next, the bulk specific gravity of the compacted specimen is determined. Preferably it is determined by the Standard Method of Test for Bulk Specific Gravity of Compacted Bituminous Mixtures Using Saturated Surface-Dry Specimens (AASHTO T 166). The test should be performed on specimens at 50 gyrations. The volumetric criteria for the specimen is shown in Table 3.

TABLE 3

Volumetric Criteria

| Test | Preferable Criteria @ 50 Gyrations | Most Preferable Criteria @ 50 gyrations |
|---|---|---|
| Air Voids (AASHTO PP-28), % | 0.5-2.5 | 0.5-1.5% |
| VMA (based on $G_{mm}$), % | 16.0 min. | 17.0 min |

The measurements in Table 3 are approximate values.

The interlayer mix blends created are subjected to a stability test. Preferably, the resistance to deformation of the compacted mixture is determined by measuring the lateral pressure developed from applying a vertical load by means of the Hveem stabiliometer. Preferably, the Standard Method of Test for Resistance to Deformation and Cohesion of Bituminous Mixtures by Means of Hveem Apparatus (AASHTO T-246 or ASTM D 1560) is performed. Preferably, the mix is aged for about 2 to 4 hours at about 135° C. Most preferably, the Standard Practice for Mixture Conditioning of Hot-Mix Asphalt (AASHTO PP2-99 Section 7.1) for mechanical property testing is performed. The following criteria shown in Table 4 should be met. The Hveem stability provides a relative ranking of the interlayer mixture's stability when placed under load.

TABLE 4

Hveem Performance Criteria

| Test | Minimum Criteria | Preferable Criteria | Most Preferable Criteria |
|---|---|---|---|
| Hveem Stability (AASHTO T-246) @ 140° F., 60° C., 100 mm molds, 50 gyrations | 22 | 25 | 28 |

The measurements in Table 4 are approximate values.

If the interlayer mixture specimen does not pass minimum criteria for the Hveem Stability test, then aggregate or binder must be re-selected. If the blend passes the Hveem test, that blend can be used.

In designing the interlayer of the present invention, the fatigue life of the interlayer mixture is measured. Fatigue specimens are created from the interlayer mixture. The specimens are compacted into slabs using a linear kneading compactor. Preferably, the slabs are kept rigid at all times until they are cut into fatigue beams. Bulk specific gravity tests are performed on the beams. Preferably, the beams have about 2.0% to 4.0% air voids. Most preferably, the beams have about 3.0% air voids. If the beams have less than about 1.0% or greater than about 5.0% air voids, then the beams should be re-made.

For each climate, fatigue life of the specimens are determined by flexural bending until failure. Preferably, the Standard Test Method for Determining the Fatigue Life of Compacted Hot Mix Asphalt (HMA) Subjected to Repeated Flexural Bending (AASHTO TP8) is performed at 2000 microstrains. Even though the stability of the interlayer of the present invention is nearing the values of typical surface course for highways, the interlayer is made to have a fatigue life that is relatively high. The criteria for this test is shown in Table 5.

TABLE 5

Flexural Beam Fatigue Performance Criteria

| Test Parameters using 4-point bending beam apparatus | Minimum Criteria | Preferable Criteria | Most Preferable Criteria |
|---|---|---|---|
| 2000 Microstrains, 10 Hz, 3.0 ± 2.0% air voids, & Test Temp.: 10° C. for ≦ PG xx-34 Type I Climate 15° C. for ≦ PG xx-22 to PG xx-34 Type II Climate 20° C. for > PG xx-22 Type III Climate | 50,000 cycles | 80,000 cycles | 100,000 cycles |

The measurements in Table 5 are approximate values.

If the existing paved surface is not structurally sound or is severely distressed, it is desirable to patch and repair it before applying the interlayer. Next, the paved surface should be prepared for receiving the interlayer by optionally sealing cracks and sweeping away loose particles.

General temperatures in which the process takes place to make the asphalt/aggregate interlayer mixture are shown in Table 6.

TABLE 6

| | Binder Type I | Binder Type II | Binder Type III |
|---|---|---|---|
| Liquid Delivery to HMA Plant | 290-320° F. | 310-340° F. | 330-360° F. |
| Mix | 300-330° F. | 320-350° F. | 340-370° F. |
| Laydown | 280-310° F. | 300-330° F. | 320-360° F. |
| Compaction | 270-300° F. | 290-320° F. | 310-340° F. |
| Finish Rolling | 180-200° F. | 180-200° F. | 180-200° F. |
| Traffic return/Overlay | <140° F. | <150° F. | <160° F. |

All of the temperatures shown in Table 6 are approximate temperatures.

The binder is typically shipped at about 290-360° F. depending on the binder type. While the binder is hot, it is mixed with aggregate. Preferably, the aggregate is heated to about 300-360° F. before being added to the mixture. The mixture includes at least about 6% by weight binder. Preferably, it includes about 6.5-11% by weight binder, and most preferably, it contains about 7-10% by weight binder. The interlayer mixture is transported and spread on the paved surface using standard hot mix construction equipment. The interlayer is applied very hot. The interlayer is usually placed at about 0.5 to 2.0 inches in thickness. Preferably, it is about 0.75 to 1.25 inches thick. Most preferably, it is about 1.0 inch thick. The interlayer thickness need not be adjusted for traffic if an overlay of an appropriate depth to protect the interlayer is selected. The density of the in-place interlayer shall be about 97%±3% of the maximum specific gravity.

The interlayer of the present invention is optimized, as described above, so that it can retard reflective cracking while supporting heavy loads. It provides both high temperature stability and low temperature flexibility. In designing the mix of the present invention, both high temperature shear strength and low temperature ductility of the binder are optimized. The mix design of the interlayer is optimized through the iterative process described above. The resulting interlayer has negligible permeability.

While the interlayer of the present invention can withstand traffic for a few days, it is not designed to be a wearing surface. An overlay is desired to provide the wearing surface, and it should be designed to meet the expected traffic demands that will be placed on the pavement. The overlay may be placed on the interlayer after it has had a chance to cool below the overlay temperature defined in Table 6 or after it has cooled for at least about 4 hours. Most preferably, the overlay is made of polymer modified asphalt and has about 98 percent reliability for the expected climate, traffic speed and traffic volume. As shown in Table 7, traffic levels indicate the minimum overlay thickness requirements.

TABLE 7

Overlay Requirements

| Traffic (20 yr Equivalent Single Axel Load (ESALs) | Minimum Asphalt Overlay Thickness |
|---|---|
| Low (<3 million) | 5 mm |
| Medium (3-10 million) | 10 mm |
| High (>10 million) | 15 mm |

The measurements listed in Table 7 are approximate values.

It is desirable to place an overlay of at least about 5 mm to protect the interlayer from rutting. Cracking will be delayed, but not completely prevented with the system of the present invention. Overlaying longitudinal joints by about 4 to 8 inches improves longitudinal crack resistance.

The system of the present invention delays the first appearance of reflective cracking. It further is effective in delaying total reflective cracking several years. It protects the pavement from moisture damage by being substantially impermeable and extends service life of the pavement. Still further, it can be recycled.

The system of the present invention is designed for, but not limited to, use on structurally sound but cracked paved surfaces. Such surfaces include, but are not limited to, Portland Cement Concrete (PCC) pavements, asphalt concrete composite pavement, and asphalt pavement. Jointed pavement should have doweled joints in reasonably good condition, and any severely distressed areas should be repaired.

The surfaces for which the interlayer of the present invention is designed may be roadways, intersections, paved areas at airports such as runways, or parking lots. It is especially useful for high volume highways or areas subject to large loads. For instance, airport runways are subject to especially large loads due to aircrafts' takeoff, landing, and taxiing operations. However, it is also useful for normal volume highways and areas subject to average loads because thinner overlays can be used.

The interlayer of the present invention is more flexible than typical hot mix products. It has enhanced load-bearing capacity, thus better resisting rutting, without overly compromising its ability to relax stresses, thereby retaining its ability to retard the formation and severity of reflective cracks. It is able to retard reflective cracking yet is dimensionally stable enough to resist rutting from heavy loads.

EXAMPLE 1

A typical HMA interlayer mix that included aggregate that included of 30% by weight natural sand was made. The Hveem stability of the mixture at 60° C. was 20 and the cycles to failure in the 4-point beam fatigue apparatus were 200,000 cycles at 10° C., 2000 microstrains, and 10 Hz. An interlayer mixture of the present invention containing aggregate that included 0% natural sand was made. The Hveem stability of this interlayer mixture at 60° C. was 29.9 and the cycles to failure were 122,606 cycles at 10° C., 2000 microstrains, and 10 Hz. The interlayer of the present invention had the following properties: Pb=8.5% asphalt content based on the total weight of the mix; Gmm=2.408; Gmb=2.388; Gb=1.025 Va=0.8%; VMA=18.6%; Gse=2.753; Absorbed asphalt (Pba)=1%. This interlayer mixture of the present invention, when laid at an airport, showed a dramatically increased degree of dimensional stability compared to the typical interlayer. The interlayer of the present invention contained the following amounts of various aggregate gradations:

TABLE 8

Aggregate Gradations - Individual and Blend

| Type<br>% in Blend | Wash Man Sand<br>B05<br>54 | Man<br>Sand B10 C<br>46 | 100 | BLEND |
|---|---|---|---|---|
| SIEVE | | | | |
| 25.0 mm | 100.0 | 100.0 | | 100.0 |
| 19.0 mm | 100.0 | 100.0 | | 100.0 |
| 12.5 mm | 100.0 | 100.0 | | 100.0 |
| 9.5 mm | 100.0 | 100.0 | | 100.0 |
| 4.75 mm | 99.6 | 99.8 | | 99.7 |
| 2.36 mm | 74.2 | 81.2 | | 77.4 |
| 1.18 mm | 41.7 | 53.8 | | 47.3 |
| 0.600 mm | 25.3 | 39.0 | | 31.6 |
| 0.300 mm | 14.7 | 29.2 | | 21.4 |
| 0.150 mm | 7.5 | 20.9 | | 13.7 |
| 0.075 mm | 4.5 | 14.5 | | 9.1 |
| Aggregate Gsb | 2.690 | 2.675 | | 2.683 |
| Sand Equivalency | 91.2 | 62 | | |

EXAMPLE 2

Another interlayer mixture of the present invention was made. It contained aggregate that included 0% natural sand. The Hveem stability of the mixture at 60° C. was 30.5 and the cycles to failure were 300,016 cycles at 10° C., 2000 microstrain, and 10 Hz. The interlayer had the following properties: Pb=8.4% asphalt content based on the total weight of the mix; Gmm=2.426; Gmb=2.392; Gb=1.025; Va=1.4%; VMA=18.4%; Gse=2.774; Absorbed asphalt (Pba)=1.2%. This interlayer mixture of the present invention, when laid at an airport, showed a dramatically increased degree of dimensional stability compared to the typical interlayer described above. The interlayer of the present invention contained the following amounts of various aggregate gradations:

TABLE 9

Aggregate Gradations - Individual and Blend

| Type<br>% in Blend | Wash Man Sand<br>B05<br>55 | Man Sand<br>B10 C<br>35 | MANNS FA-<br>21<br>10 | 100 |
|---|---|---|---|---|
| SIEVE | | | | BLEND |
| 25.0 mm | 100.0 | 100.0 | 100.0 | 100.0 |
| 19.0 mm | 100.0 | 100.0 | 100.0 | 100.0 |
| 12.5 mm | 100.0 | 100.0 | 100.0 | 100.0 |
| 9.5 mm | 100.0 | 100.0 | 100.0 | 100.0 |
| 4.75 mm | 99.6 | 99.8 | 99.8 | 99.7 |
| 2.36 mm | 74.2 | 81.2 | 74.6 | 76.7 |
| 1.18 mm | 41.7 | 53.8 | 48.7 | 46.6 |
| 0.600 mm | 25.3 | 39.0 | 35.5 | 31.1 |
| 0.300 mm | 14.7 | 29.2 | 27.0 | 21.0 |
| 0.150 mm | 7.5 | 20.9 | 20.0 | 13.4 |
| 0.075 mm | 4.5 | 14.5 | 14.1 | 9.0 |
| Aggregate Gsb | 2.690 | 2.675 | 2.688 | 2.685 |
| Sand Equivalency | 91.2 | 62 | 64.9 | |

FIG. 1 shows that the Hveem stability of interlayer mixes of the present invention (Examples 1 and 2) is similar to that of a conventional HMA. FIG. 2 shows that fatigue performance of the interlayer mixes of the present invention (Examples 1 and 2) is vastly superior to the fatigue performance of conventional HMA. FIG. 3 shows the permeability of the interlayer mixes of the present invention (Examples 1 and 2) compared with the permeability of conventional HMA and compared with the permeability of a fabric interlayer. Again, the interlayer mixes of the present invention are superior to conventional HMA, and one of the mix designs of the present invention is significantly superior to a fabric interlayer.

From the foregoing, it will be seen that this invention is one well adapted to attain all the ends and objects herein above set forth together with other advantages which are obvious and inherent to the system. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth is to be interpreted as illustrative and not in a limiting sense.

We claim:

1. An interlayer for placement on a paved surface, comprising a mixture of:
    aggregate comprised of no more than about 15% by weight natural sand, wherein said aggregate that is not natural sand is manufactured sand with an angularity of at least 38%, and wherein said aggregate is comprised of about 80% by weight to about 100% by weight aggregate having a sieve size of less than about 4.75 mm; and
    an asphalt binder, wherein said interlayer has a Hveem Stability at 60° C. and 50 gyrations of at least about 22 and a Flexural Beam Fatigue of at least about 50,000 cycles at 2000 microstrains, 10 Hz, 3.0±2.0% air voids, at 0-30° C.;
where the mixture is covered with an asphalt overlay.

2. The interlayer of claim 1, wherein said asphalt binder is a polymer modified asphalt binder.

3. The interlayer of claim 1, wherein said interlayer is about 0.5 to 2 inches thick on a paved surface.

4. The interlayer of claim 1, wherein said binder is chosen based on the temperature associated with the regional climate.

5. The interlayer of claim 1, wherein said binder is chosen from a Type I binder for Northern Type I climates, a Type II Binder for Central Type II climates, and a Type III binder for Southern Type III climates.

6. The interlayer of claim 1, wherein said interlayer is substantially impermeable.

7. The interlayer of claim 1, wherein said aggregate is comprised of no more than about 10% by weight natural sand.

8. The interlayer of claim 1, wherein said aggregate is comprised of no more than about 5% weight natural sand.

9. The interlayer of claim 1, wherein said aggregate is comprised of about 40% by weight to about 70% by weight aggregate having a sieve size of less than about 1.18 mm.

* * * * *